United States Patent
Todogawa et al.

(10) Patent No.: US 6,523,178 B1
(45) Date of Patent: Feb. 18, 2003

(54) VIDEO TRANSMISSION SYSTEM

(75) Inventors: Norifumi Todogawa, Kanagawa (JP); Masaharu Yamamoto, Kanagawa (JP); Wada Yoshiyuki, Kanagawa (JP); Takehiko Fujiyama, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/183,371

(22) Filed: Oct. 30, 1998

(30) Foreign Application Priority Data

Mar. 9, 1998 (JP) .......................................... 10-057111

(51) Int. Cl.[7] .......................... H04N 7/173; H04N 7/12; H02N 3/05; H04L 12/28; H04J 3/16
(52) U.S. Cl. ....................... 725/151; 725/131; 725/139; 370/395.1; 370/469; 714/4; 714/25; 375/240.25; 348/737
(58) Field of Search ........................... 725/98, 118, 148, 725/131, 139, 151; 370/395.1, 395.64, 469–476, 241–242, 244–245, 398–399; 714/4, 25; 375/240.25; 348/737

(56) References Cited

U.S. PATENT DOCUMENTS

| | | | | |
|---|---|---|---|---|
| 5,499,238 A | * | 3/1996 | Shon | 370/60.1 |
| 5,768,308 A | * | 6/1998 | Pon et al. | 375/219 |
| 5,793,767 A | * | 8/1998 | Soda et al. | 370/397 |
| 5,812,527 A | * | 9/1998 | Kline et al. | 370/232 |
| 5,898,669 A | * | 4/1999 | Shimony et al. | 370/232 |
| 5,991,912 A | * | 11/1999 | Mao | 714/776 |
| 6,002,668 A | * | 12/1999 | Miyoshi et al. | 370/232 |
| 6,091,708 A | * | 7/2000 | Matsunuma | 370/233 |

* cited by examiner

Primary Examiner—Andrew Faile
Assistant Examiner—Son P. Huynh
(74) Attorney, Agent, or Firm—Katten Muchin Zavis Rosenman

(57) ABSTRACT

In a video transmission system which transmits video data through an ATM network, the ATM network sets up fixed virtual connections between transmitters and a receiver. In the receiver, a connection control portion designates a desired one of the virtual connections and a header controller only extracts cells of the designated virtual connection.

13 Claims, 12 Drawing Sheets

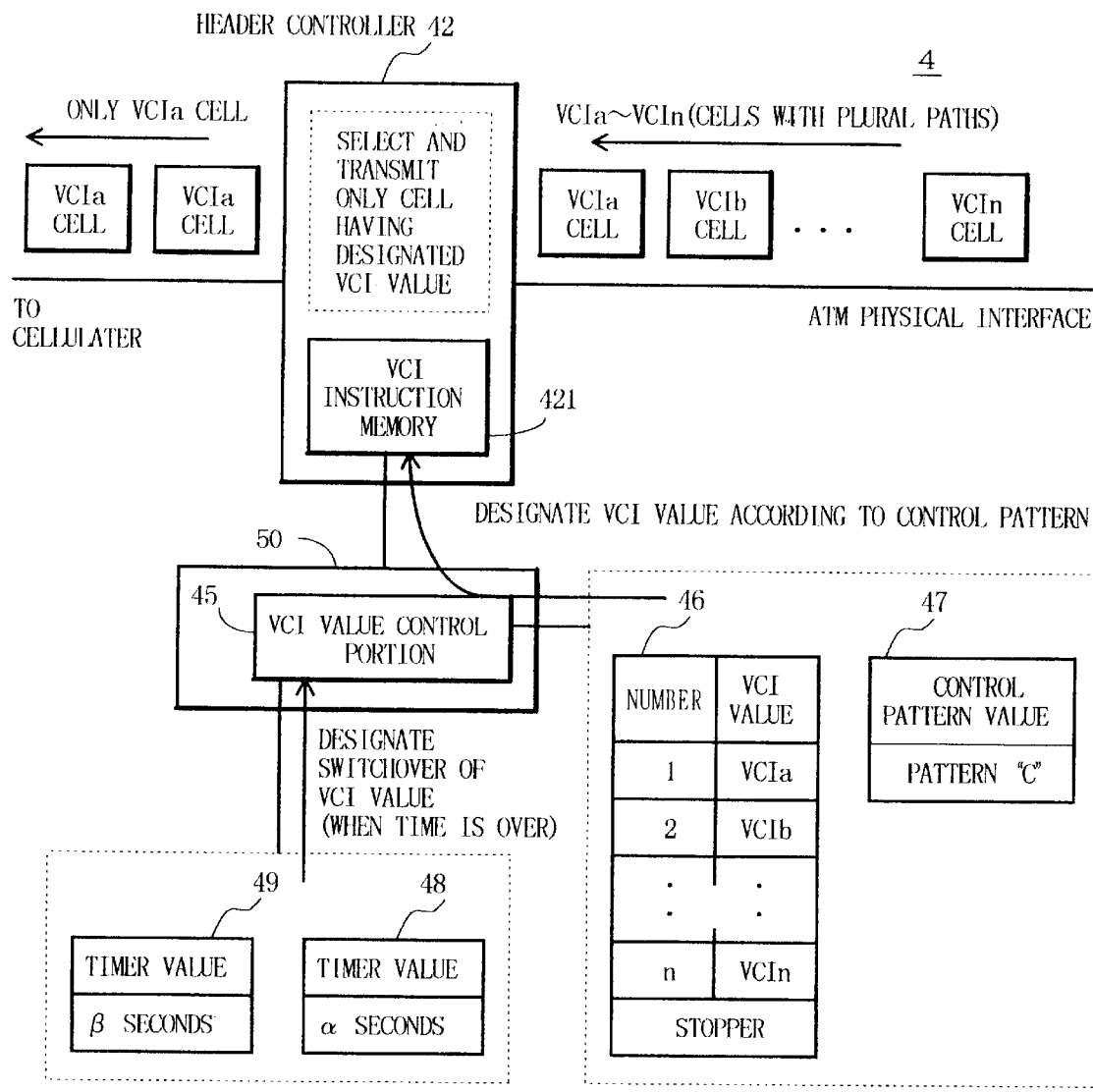

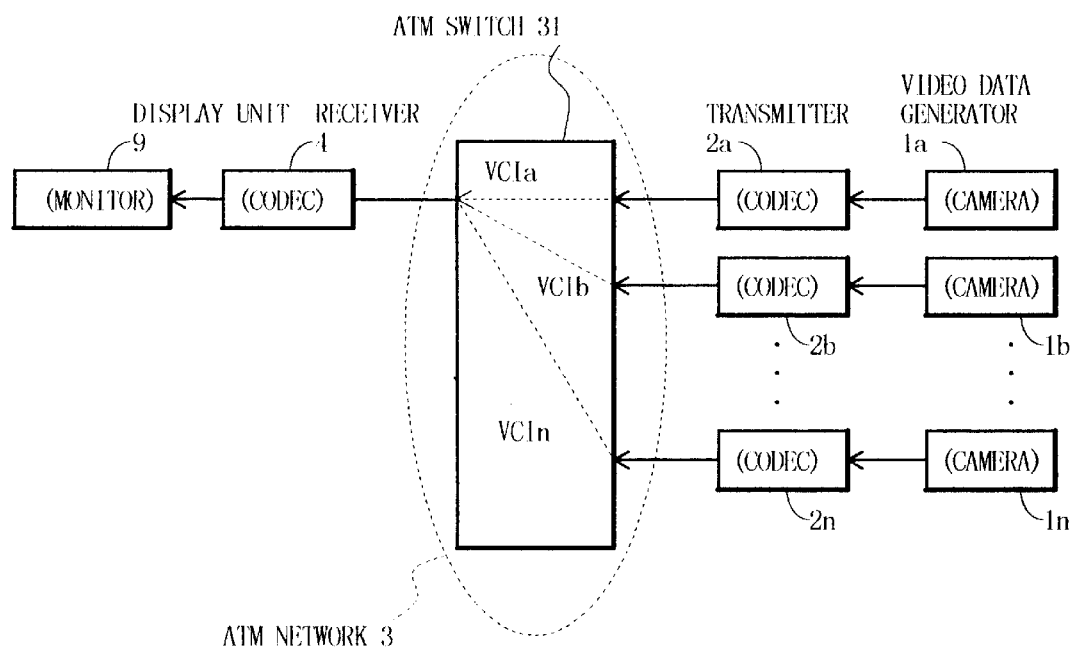

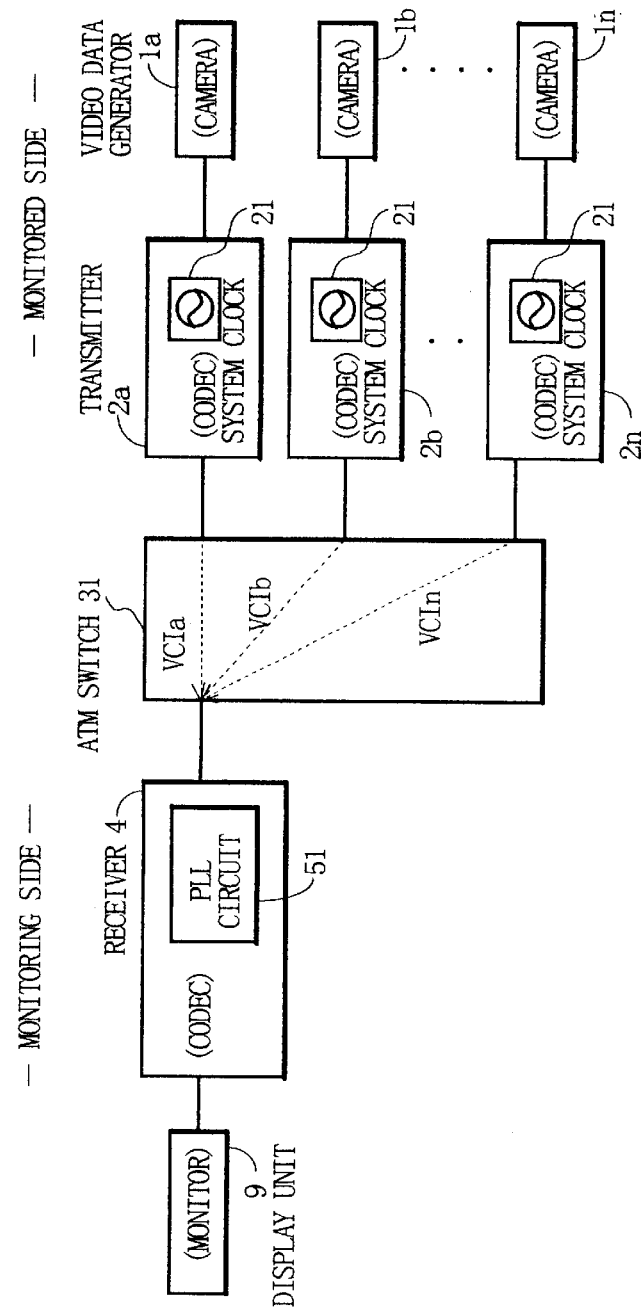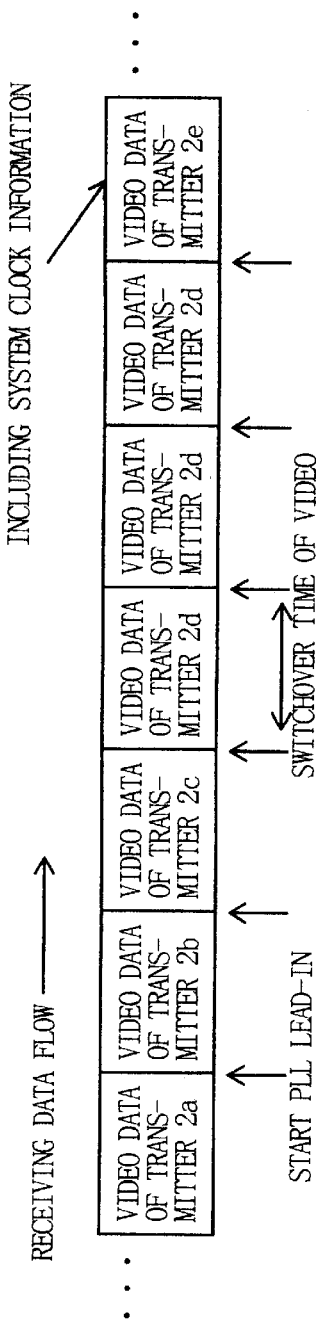

VIDEO TRANSMISSION SYSTEM

BACKGROUND OF THE INVENTION

1. Field of the Invention

The present invention relates to a video transmission system, and in particular to a video transmission system which transmits video data through an ATM network.

As a recent communication is carried out in the form of multimedia, the transmission of multimedia information including dynamic video information has become more and more important. For the transmission of the multimedia information, the ATM network is suitable which has a high-speed transmission rate, a variable transmission rate function, and a multi-connection function.

Particularly in a video monitoring apparatus, a receiver is required with a function for receiving dynamic videos of a plurality of cameras and to display them on one screen switched over one after another.

2. Description of the Related Art

FIG. 10 shows an arrangement (1) of a prior art video transmission system, in which video data generators 1a–1n are connected to transmitters (CODEC) 2a–2n respectively, which are connected to receivers (CODEC) 4a–4n through an ATM switch 31 which forms an ATM network 3 with virtual channels VCIa–VCIn as fixed virtual connections, PVC's (Permanent Virtual Connections (Circuits)). The receivers 4a–4n n are commonly connected to a selector 8, which is connected to a display unit 9.

In operation, the transmitters 2a–2n encode and cellulate video data received from the video data generators 1a–1n respectively and send the cellulated video information to the receivers 4a–4n respectively through the virtual channels VCIa–VCIn. The receivers 4a–4n decellulate and decode the received video information and send the decoded video data to the selector 8. The selector 8 selects one of the video data to be sent to the display unit 9, which displays the video data.

This video transmission system is defective in that the introduction cost rises high because the same number of receivers as the transmitters are required.

FIG. 11 shows an arrangement (2) of the prior art video transmission system, in which the same number of receivers as the transmitters are not required, and compared with the arrangement (1) shown in FIG. 10 where the receivers 4a–4n are provided, only one receiver 4 is provided and the selector 8 is not provided to reduce cost. Also, between one of the transmitters 2a–2n and the receiver 4, virtual channels VCIa–VCIn as switched virtual connections (SVC) corresponding to the transmitters 2a–2n are set up.

In operation, different from the arrangement (1), when the video information of the transmitter 2a is displayed on the display unit 9, the virtual channel VCIa is set up between the transmitter 2a and the receiver 4, and through the virtual channel VCIa the transmitter 2a sends the video information to the receiver 4. When the video information of the transmitter 2b is displayed, the virtual channel VCIb is newly set up between the transmitter 2b and the receiver 4, and through the virtual channel VCIb the transmitter 2b sends the video information to the receiver 4.

FIG. 12A specifically shows a system clock of the transmitters and the receiver in the arrangement (2) shown in FIG. 11.

The transmitters (CODEC) 2a–2n holds the system clock 21 respectively, and the receiver (CODEC) 4 holds a PLL circuit 51 which includes the system clock.

In operation, for example, when the transmitter 2a and the receiver 4 are mutually connected with the virtual channel VCIa, system clock standard information PCR (Program Clock Reference) which is included in the video data out of the transmitter 2a is sent to the receiver 4 through the virtual channel VCIa. In the receiver 4, the PLL circuit 51 leads in the frequency of the system clock (not shown) of its own with reference to the system clock standard information PCR so that the frequency may become the same as that of the system clock 21 of the transmitter 2a.

FIG. 12B shows an example of the video data received by the receiver 4.

By the channel switchover operation of the ATM switch 31 the receiver 4 receives the system clock information and the video data synchronized therewith from the transmitters 2a–2e in order.

Since the system clocks of the receiver 4 and transmitters 2a–2n are asynchronous with each other, the PLL circuit 51 in the receiver 4 has to execute a lead-in operation of the clock at the time when the video data are switched over. Normally, since additional (average) processes are executed for the lead-in operation more than several tens of times for the measure of clock jitter, the lead-in time is elongated.

There are some defects in the video transmission system in the arrangement (2) as follows;

① Since the video data are not sent to the receiver while the ATM switch 31 switches over the connection (the virtual channel), phenomena such as a temporary freeze or blackout in the worst case, of the display video arise;

② Since more switchover time is required when the video data is sent through a plurality of ATM switches, the above phenomena arise remarkably and so are not suitable for the monitoring operation in a wide area;

③ The lead-in time is so long that it takes long until the system clock becomes stable.

SUMMARY OF THE INVENTION

It is accordingly an object of the present invention to provide a video transmission system comprising; transmitters in which video data from video data generators are encoded, cellulated and outputted, an ATM network which transmits the cellulated video data, a receiver in which the cellulated video data received through the ATM network are decellulated, decoded and outputted, and a display unit which displays the video data wherein at a switchover of the video data, a temporary freeze or blackout of a display screen is removed, the switchover is executed at a high-speed, and a lead-in operation time for a system clock is shortened.

[1] In order to achieve the above-mentioned object in a video transmission system according to the present invention, the ATM network provides fixed virtual connections between the transmitters and the receiver, and the receiver includes a connection control portion for designating a desired one of the virtual connections, and a header controller only extracts cells of the designated virtual connection.

FIG. 1 shows a schematic arrangement of a video transmission system according to the present invention, in which the video data generators 1a–1n which generate the video data are connected respectively to the transmitters 2a–2n, which are connected to the receiver 4 through an ATM switch 31 which forms the ATM network 3. It is assumed that between the transmitters 2a–2n and the receiver 4 fixed virtual connections PVCa, PVCb, . . . , PVCn are preliminarily set up. The receiver 4 includes the connection control portion and the header controller (both are not shown).

The connection control portion designates the virtual connection e.g. PVCa which includes the video data to be displayed from among the fixedly provided virtual connections PVCa, PVCb, . . . , PVCn. The header controller only extracts a cell VCIa of the virtual connection PVCa which is designated by the connection control portion and abandons other cells.

Namely, the video data of the video data generators 1*a*–1*n* are multi-connected by the ATM switch 31 and are inputted commonly to the receiver 4. In the receiver 4, the header controller only selects the video data of the virtual connection designated by the connection control portion.

As a result, without the switchover operation of the ATM switch 31 it becomes possible for the receiver 4 to display exclusively the video of the video data generator as designated, to avoid a temporary freeze or blackout of the display screen due to the switchover operation of the ATM switch, and to execute the switchover at a high-speed.

[2] In the above-mentioned invention [1], the receiver may further comprise a connection information memory which has stored the virtual connections to be read out in a predetermined order, and the connection control portion may read out the virtual connection stored in the connection information memory based on an externally designated connection signal and may designate the virtual connection to the header controller.

FIG. 2 shows a schematic arrangement of the receiver 4 shown in FIG. 1. An ATM physical interface 41 is connected to the ATM network (not shown), and to the header controller 42, a decellulater 43 and a decoder 44 in cascade. The header controller 42, the decellulater 43 and the decoder 44 are commonly connected to a control unit 50.

The control unit 50 includes the connection control portion 4 5, which is connected to the connection information memory 46, a control pattern information memory 47, a switchover timer 48, an alarm monitoring timer 49, and an external interface (not shown).

In operation, the connection information memory 46 has preliminarily stored a plurality of virtual connections in order. The external interface inputs an externally designated connection signal which designates the virtual connection by the number to the connection control portion 45. The connection control portion 45 reads out the virtual connection corresponding to the designated connection number from the connection information memory, and instructs the header controller 42 to only extract the cell of the virtual connection. The header controller 42 executes this instruction.

As a result, it becomes possible to designate the video data of the video data generator to be displayed directly from the outside.

[3] In the above-mentioned invention [2], the connection control portion may read out the virtual connection stored in the connection information memory at every external input timing instead of the virtual connection which is designated by the externally designated connection signal, and may designate it to the header controller.

This will be described referring to the schematic arrangement shown in FIG. 2. Instead of the above-mentioned externally designated connection signal which designates the virtual connection, the external interface inputs a timing signal which designates the start point of the operation to the connection control portion 45. With this input timing, the connection control portion 45 reads out the next virtual connection from the connection information memory 46, which is designated to the header controller 42.

As a result, it becomes possible to switch over a display signal which is displayed on the display unit in order according to the switchover order of the virtual connection preliminarily stored in the connection information memory at every timing which is designated from the outside.

[4] In the above-mentioned invention [3], the receiver may include inside a switchover timer which times a switchover timing of the virtual connection instead of the external input timing.

Namely, in FIG. 2 the switchover timer 48 outputs a switchover timing signal to the connection control portion 45 at predetermined time intervals. The connection control portion 45 and the header controller 42 which have received the switchover timing signal execute hereafter the same operation as in the case where they receive the above-mentioned external switchover timing signal.

As a result, it becomes possible to sequentially switch over the displayed video data according to the switchover order of the virtual connection preliminarily stored in the connection information memory 46 at the predetermined time intervals automatically by the switchover timer 48.

[5] Also in order to achieve the above-mentioned object in an image transmission system according to the present invention, the ATM network may provide a plurality of fixed virtual connections between the transmitters and the receiver, and the receiver may include a header controller which only extracts cells of a designated one of the virtual connections, a connection information memory which has stored the virtual connections to be read out in a predetermined order, a fault detector which detects a fault of the designated virtual connection, an alarm monitoring timer which times a continuous time of the fault, and a connection control portion which reads out the next virtual connection for detour from the memory when the fault continues longer than a predetermined time, and designates the virtual connection for detour as the designated virtual connection to the header controller.

Namely, between the transmitters and the receiver a plurality of e.g. fixed virtual connections (PVC1–PVCn) are set up.

The connection information memory stores the virtual connections (PVC1–PVCn) in this order. Detecting a fault in the virtual connection which is designated at present, e.g. the virtual connection (PVC1), the fault detector makes the operation of the alarm monitoring timer start.

When the fault of the virtual connection (PVC1) is timed by the alarm monitoring timer and the fault time continues longer than a predetermined time, the connection control portion reads out the next virtual connection (PVC2) for the detour from the connection information memory and designates this virtual connection (PVC2) to the header controller. The header controller only extracts cells of the virtual connection (PVC2).

As a result, by setting up a plurality of fixed virtual connections between the transmitters and the receiver, when the fault has occurred in the presently designated virtual connection (PVC1) the receiver can autonomously switch over the present virtual connection to the next one for the detour without routing again by the ATM switch.

[6] In the above-mentioned invention [5], the fault detector may detect that a stream of the video data is discontinuous.

Namely, the fault detector may detect a discontinuity of the stream of the video data as the fault of the present virtual connection.

[7] In order to achieve the above-mentioned object in a video transmission system according to the present invention, the ATM network may provide a single or a plurality of fixed virtual connections between the transmitters and the receiver, and the receiver may include a header controller which only extracts cells of a designated one of the virtual connections, a control pattern information memory for storing a control pattern, a connection information memory which has stored the virtual connections to be read out in a predetermined order, a switchover timer which times a switchover timing of the virtual connection, a fault detector which detects a fault of the designated virtual connection, an alarm monitoring timer which times a continuous time of the fault, and a connection control portion which designates, based on the control pattern, a single selected virtual connection to the header controller which corresponds to the virtual connection designated from outside, the virtual connection which is read out from the connection information memory in order at every external input timing or the switchover timing, or the virtual connection for detour which is read out from the connection information memory when the fault continues longer than a predetermined time.

Namely, in the control pattern information memory 47 shown in FIG. 2 a pattern information which designates the control pattern shown in the present inventions [1]–[6] is stored. The receiver 4 reads out the pattern information from the connection control portion 45, and executes one of the operations in the present inventions [1]–[6] based on the designated control pattern.

As a result, it becomes possible to designate the control pattern of the receiver 4 with the pattern information of the control pattern information memory 47. It is to be noted that the pattern information stored in the control pattern information memory 47 may be fixed or changed from the outside.

[8] In the above-mentioned invention [1], each of the transmitters may include a transmitter's system clock generator, a transmitter's clock information counter which counts the system clock information based on a clock of the clock generator, and makes the cells include the system clock information, and the receiver may comprise a connection control portion which designates one of the virtual connections at a predetermined switchover timing, a header controller which only extracts cells of the designated virtual connection, a clock information register which temporarily stores in order a system clock information value included in the extracted cells, a receiver's system clock generator, a receiver's clock information counter which loads the value of the clock information register at the switchover timing and counts the receiver's clock of the clock generator, a subtracter which subtracts the values between the clock information register and the receiver's clock information counter, and a control circuit which controls a frequency of the receiver's system clock generator so that the subtracter value may become 0.

Namely, each transmitter makes the cell (the video data) include the system clock information whose clock of the system clock generator of its own is counted by the clock information counter and transmits the information. In the receiver, the connection control portion designates one of the virtual connections at the predetermined switchover timing. The header controller extracts the system clock information value, included in the cells of the designated virtual connection, which the clock information register stores.

The receiver's clock information counter counts the clock of the receiver's clock generator. In the receiver's clock information counter, the value of the clock information register is loaded at the switchover timing. The subtracter subtracts the values between the clock information register and the receiver's clock information counter, and the control circuit controls the frequency of the receiver's system clock generator so that the value of the subtracter may become 0.

As a result, it becomes possible for the receiver to lead in the frequency of the system clock of its own to the frequency of the system clock of the transmitter which is connected to the presently designated virtual connection at a high-speed for the synchronization.

[9] In the above-mentioned invention [8], the system clock information may comprise a PCR clock standard information prescribed by MPEG 2.

Namely, the video information may be transmitted with the encoding method prescribed by the MPEG 2, and the system clock information may comprise the PCR (the Program Clock Reference: the clock standard information) prescribed by the MPEG 2.

[10] In the above-mentioned invention [1], the receiver may further include a video display memory for storing the video data, and the connection control portion may stop writing the video data in the video display memory when the virtual connection is designated and may freeze the present display.

Namely, the connection control portion stops writing the video information in the video display memory at the timing of designating the virtual connection.

As a result, by freezing the display video with the previous video it becomes possible to prevent the display video from its disorder due to the discontinuity of the video elementary stream at the switchover time of the virtual connection.

[11] In the above-mentioned invention [1], the receiver may further include a video decoder for decoding the decellulated video information to the video data to be sent to the video display memory and detects a stream discontinuity of the video information to generate a warning signal, and the connection control portion may mask the warning signal for a predetermined time at the switchover timing.

Namely, the video decoder detects the stream discontinuity of the video information and generates the alarm signal. The connection control portion masks this alarm signal to be neglected until a predetermined time passes from the switchover timing of the virtual connection.

As a result, this masking operation enables a stream discontinuity other than the alarm signal to be indicated without generating the alarm signal which shows the stream discontinuity due to the virtual connection switchover.

[12] In the above-mentioned invention [1], the receiver may further comprise a blackout data generator which generates blackout data for blacking out the screen of the display unit, a selector which selects the blackout data or the video data from the video decoder and outputs the video data to the video display memory, a timer which times a time until a receiving data notification signal showing that a new screen is completed is received out of the video decoder from the predetermined switchover timing as a start point and outputs a time-out signal when the time is longer than a predetermined time, and the connection control portion may instruct the selector to select the blackout data when the time-out signal is received and the video display memory to release write stop of the video data.

The above-mentioned freezing operation is generally to hold the screen before the screen is switched over to a new screen, and is released when a single screen of the video sent from a newly switched transmitter is completed. However, when there is something wrong with the new transmitter so that the new screen is not completed, the state where the screen is freezed continues. A monitoring person may not notice this abnormal state.

Therefore, in this invention [12], the timer counts the time until the reception data notification signal indicating that the new screen is completed from the switchover timing of the virtual connection as the start point is received from the video decoder and outputs the time-out signal when the time is longer than the predetermined time. The connection control portion which has received this signal instructs the selector to select the blackout data for blacking out the display screen and releases the write stop of the video data in the video display memory to cancel the freezing.

As a result, it becomes possible for the monitoring person to recognize the abnormality of the video transmission system.

[13] In the above-mentioned invention [1], the receiver may further include a cell separator, and a receiving buffer which is connected between the cell separator and the video decoder and which temporarily stores the video information from the cell separator, and the connection control portion may clear the receiving buffer at the predetermined switchover timing.

In a stable communication state, the transmitter estimates the remainder of the receiving buffer of the receiver from the remainder of the video data stored in a transmitting buffer of its own, and controls an video information generation quantity so that an overflow or an underflow failure may not occur in both of the buffers.

However, when the receiver switches over the transmitter with which the receiver communicates, the data remainder of the receiving buffer in the receiver which the new transmitter estimates does not always coincide with the actual remainder. As a result, when the receiving buffer overflows, it is necessary to throw away or clear all of the data. The time point where this overflow occurs cannot be forecast. On the other hand, when the receiving buffer underflows, it is enough to stop reading out the data from the receiving buffer and to freeze the display video.

In this invention, the connection control portion compulsorily clears the receiving buffer at the switchover timing of the virtual connection. The receiving buffer starts to store the video information of the new virtual connection switched over from the state where there is little remainder in the buffer. As a result, the receiving buffer can avoid the overflow.

[14] In the above-mentioned invention [1], the receiver may further include a superimposing portion which stores an identifier or position information of the transmitter corresponding to the virtual connection and outputs the identifier or the position information corresponding to the virtual connection designated by the connection control portion, and a multiplexer which superimposes the outputs of the superimposing portion and the video display memory by an instruction of the connection control portion.

Namely, the receiver holds a corresponding table of the virtual connection with respect to the place name where each transmitter is located or the identifier corresponding. Referring to this corresponding table, the superimposing portion outputs the place name or the identifier of the transmitter connected to the present virtual connection the connection control portion designates. The multiplexer transfers the output of the video display memory overlapped with the place name or the identifier.

As a result, the video or the place from which the video has been sent is displayed in the display unit.

[15] In the above-mentioned invention [1], the virtual connection may be designated by a virtual pass identifier or a virtual channel identifier included in the cell.

Namely, the externally designated connection signal or the virtual connection which the connection information memory stores may comprise a VPI (Virtual Path Identifier) or a VCI (Virtual Channel Identifier) of the header included in the ATM cell which the receiver receives.

[16] In another aspect, the present invention may provide an apparatus in which cellulated video data received through an ATM network providing fixed virtual connections are decellulated, decoded and outputted, comprising; a connection control portion for designating a desired one of the virtual connections, and a header controller which only extracts cells of the designated virtual connection.

[17] Furthermore, the present invention may also provide a video transmission method comprising the steps of; endoding, cellulating, and transmitting video data; receiving, decellulating, and decoding the cellulated video data received through an ATM network providing fixed virtual connections; designating a desired one of the virtual connections, and extracting only cells of the designated virtual connection.

[18] Alternatively, a video transmission method may be provided comprising the steps of; endoding, cellulating, and transmitting video data; receiving, decellulating, and decoding the cellulated video data received through an ATM network providing fixed virtual connections,; extracting only cells of a designated one of in the virtual connections; reading out the virtual connections stored in a memory in a predetermined order; detecting a fault of the designated virtual connection; timing a continuous time of the fault; reading out a next virtual connection for detour from the memory when the fault continues longer than a predetermined time; and designating the virtual connection for detour as the designated virtual connection for the extraction.

[19] Alternatively, a video transmission method may also provided comprising the steps of; endoding, cellulating, and transmitting video data; receiving, decellulating, and decoding the cellulated video data received through an ATM network providing fixed virtual connections; extracting only cells of a designated one of the virtual connections; reading out the virtual connections stored in a memory in a predetermined order; timing a switchover timing of the virtual connection; detecting a fault of the designated virtual connection; timing a continuous time of the fault; and designating, based on a stored control pattern, a single selected virtual connection for the extraction which corresponds to the virtual connection designated from outside, the virtual connection which is read out from the memory in order at every external input timing or the switchover timing, or the virtual connection for detour which is read out from the memory when the fault continues longer than a predetermined time.

BRIEF DESCRIPTION OF THE DRAWINGS

FIG. 3 is a block diagram showing an embodiment of a receiver used in the present invention;

FIGS. 4A and 4B are block diagrams showing an operation embodiment (1) of a video transmission system according to the present invention;

FIG. 11 is a block diagram showing an arrangement (2) of a conventional video transmission system; and FIGS. 12A and 12B are block diagrams showing an arrangement of a video transmission system which can be applied to the present invention and particularly relating to a system clock.

Throughout the figures, like reference numerals indicate like or corresponding components.

DESCRIPTION OF THE EMBODIMENTS

Figure 1:
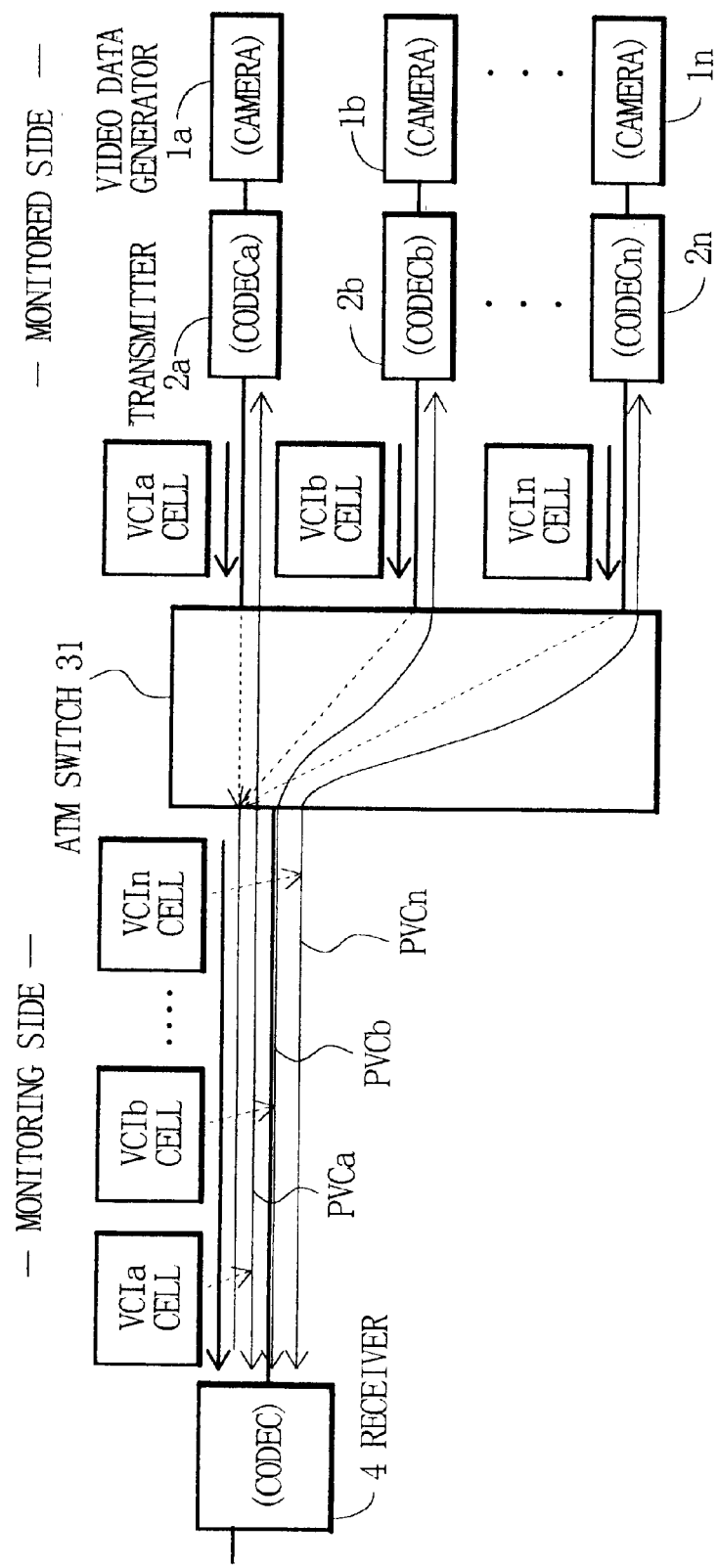
FIG. 1 is a block diagram showing an example of a virtual connection set up in a video transmission system according to the present invention.

FIG. 3 shows an embodiment of the receiver used in the present invention. In this embodiment, on the assumption that as shown in FIG. 1 the fixed virtual connections PVC are set up between the receiver 4 and the transmitters 2a–2n, all of the ATM cells VCIa–VCIn are inputted to the receiver 4 from the transmitters 2a–2n without any selection in the ATM switch 31.

Figure 2:
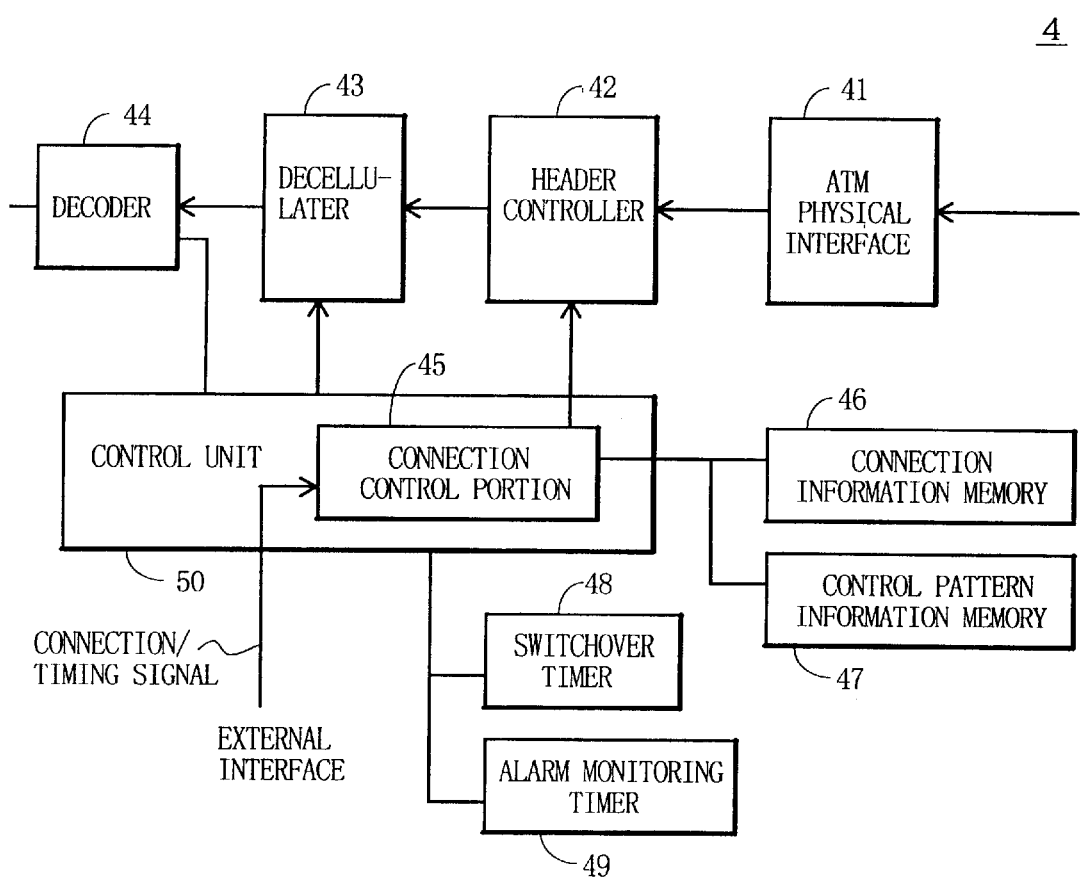
FIG. 2 is a block diagram showing a schematic arrangement of a receiver in a video transmission system according to the present invention.

In this embodiment, the ATM physical interface 41, the decellulater 43 and the decoder 44 shown in the schematic arrangement in FIG. 2 are not shown. The connection control portion 45 and the connection information memory 46 are indicated as a VCI value control portion 45 and a channel information memory 46, respectively. The connection between the components is the same as the schematic arrangement in FIG. 2.

The channel information memory 46 stores identifiers VCIa–VCIn which designate a virtual connection in a designated order. A control pattern information memory 47 stores a control pattern value "C", and a switchover timer 48 and an alarm monitoring timer 49 store timer values "α" and "β", respectively. The control pattern "C" is assumed to be used for switching over the virtual connections per a time set by the switchover timer 48.

The basic operation of the receiver 4 will be described as follows:

Reading out the pattern "C" from the memory 47 to acknowledge the control pattern, and starting the time of the switchover timer 48, the VCI value control portion 45 reads out the first VCI value="VCIa" from the memory 46 and writes this value in a VCI indicating memory 421. A header controller 42 selects only the VCIa cell equal to the "VCIa" whose virtual channel identifier VCI is designated from among the inputted VCIa cell–VCIn cell by the indicating memory 421, transmits it to the decellulater and abandons the other cells.

The switchover timer 48 expires the time in "α" seconds after the timer has started, designates a switchover timing of the VCI value to the VCI value control portion 45 at the time up after "α" seconds from the start timing, and starts to time the next "α" seconds. The VCI value control portion 45 reads out the next VCI value="VCIb" from the memory 46 and writes this value in the indicating memory 421. The header controller 42 selects and takes in only the cell whose virtual channel identifier VCI is the "VCIb".

Thereafter, the header controller 42 selects and outputs the VCI value cell (video data) stored in the memory 46 every "α" seconds in order. When the header controller 42 reads out a stopper from the memory 46, returning to the number 1 and reading out the "VCIa" to repeat the same operation.

As a result, in the header controller 42 the video data (cell) is switched over and is taken every "a " seconds at a high-speed switching time.

FIG. 4 shows an operation embodiment (1) of the video transmission system of the present invention. In this embodiment, the operation is executed in which an external interface designates the number of the virtual channel and the switchover timing (hereinafter referred to as a control pattern "A").

Figure 4A:
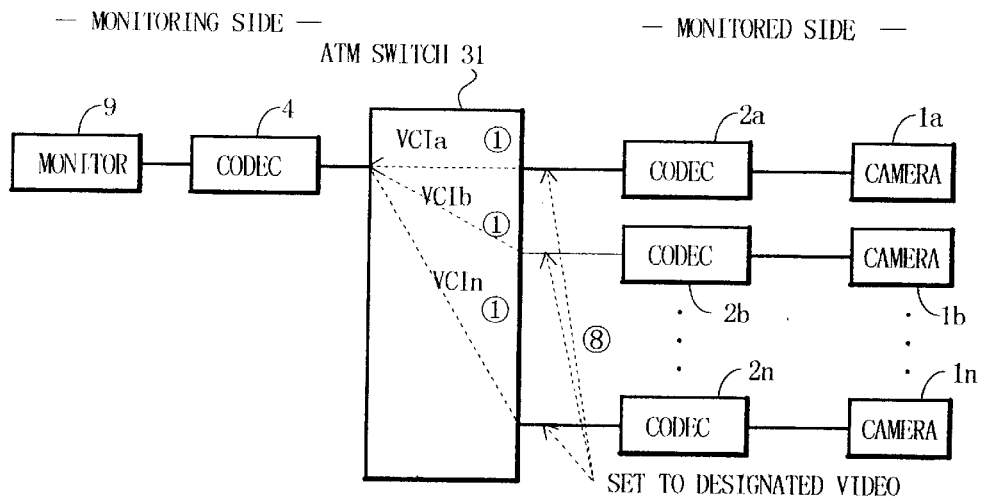
FIGS. 4A and 4B are block diagrams showing an operation used in the present invention.

FIG. 4A shows an arrangement of the video transmission system of the present invention, which is the same as the arrangement of the video transmission system shown in FIG. 1.

Figure 4B:
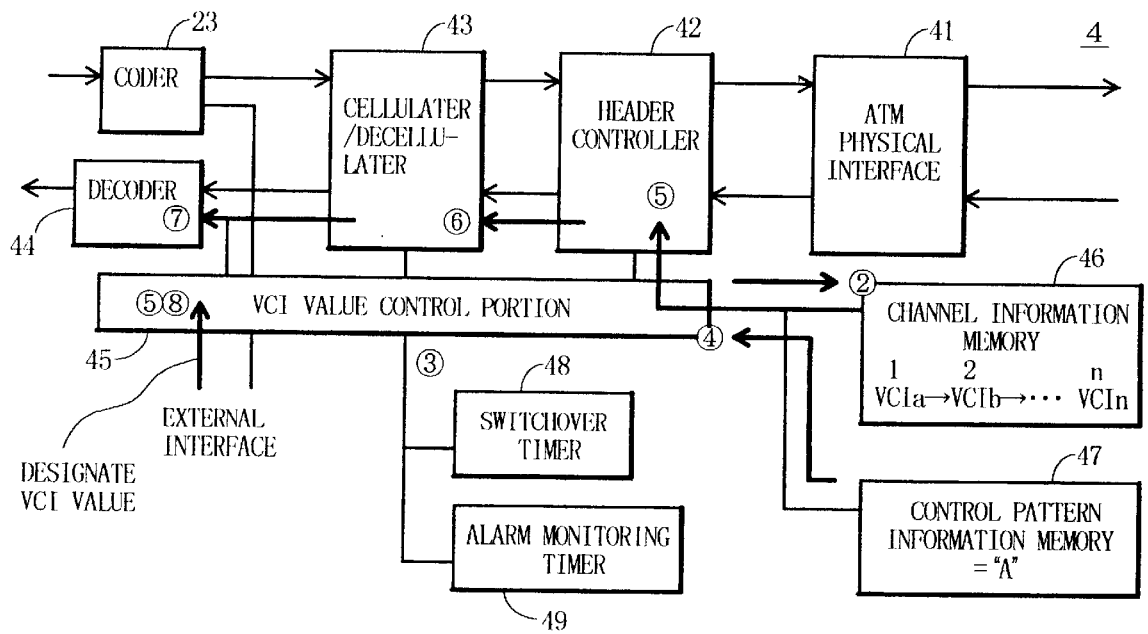

FIG. 4B shows an arrangement of the receiver (CODEC). Compared with the arrangement of the receiver shown in FIG. 2, it is different that a coder 23 which is used for the video transmission is added in FIG. 4B and is connected to a cellulater/decellulater 43 instead of the decellulater 43 in FIG. 2.

An output signal of a cellulater in the cellulater/decellulater 43 is outputted through the header controller 42 and the ATM physical interface 41, thereby forming a CODEC as a whole. Since the transmission operation of the CODEC has nothing to do with the present invention, the description will be omitted in the following.

On the assumption that in the control pattern information memory 47 the control pattern "A" is preset, the operation of the video transmission system will be described referring to FIG. 4A and 4B as follows:

① The fixed virtual connections PCV (VCIa–VCIn) are preliminarily set up respectively between the receiver 4 and the transmitters 2a–2n through the ATM switch 31.

② In the channel information memory 46, the virtual channel identifiers VCIa , VCIb . . . VCIn as channel information are set or stored in the order of channel switchover.

③ The switchover timer 48 is assumed to be inoperative in this embodiment.

④ The VCI value control portion 45 reads out the control pattern "A" from the memory 47.

⑤ The control portion 45 recognizes that the control pattern "A" is—an externally designated switchover—. The external interface designates a channel information setting order, for example "2" corresponding to the camera 1b, to the control portion 45. The control portion 45 reads out e.g. the channel information VCIb corresponding to "2" from the memory 46 and sets it in the header controller 42.

⑥ The header controller 42 sends only the cell including the same virtual channel identifier as the set channel information VCIb to the cellulater/decellulater 43.

⑦ The decellulater 43 sends the decellulated video information to the decoder 44, which outputs the video data after having decoded the video information. Accordingly, the image of the camera 1b as an object is to be reproduced in the display unit (not shown).

⑧ The external interface instructs the number of the next designated channel to the VCI value control portion 45. Thereafter, the above operations ⑥–⑧ are repeated and the image of the video camera corresponding to the designated channel is switched over to be displayed by the display unit.

Although in this embodiment the virtual channel number is designated from the external interface, it is also possible to designate the virtual channel identifier itself and to designate the virtual channel in the header controller 42 directly without referring to the channel information memory 46.

Figure 5A:
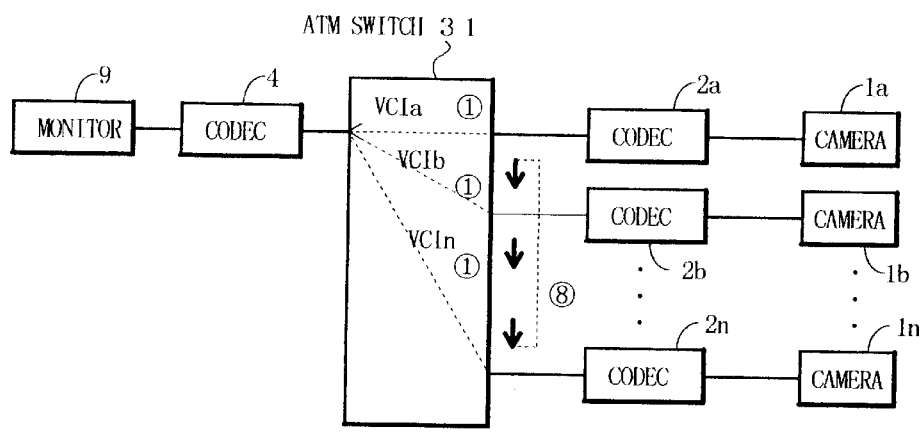
FIGS. 5A and 5B are block diagrams showing an operation embodiment (2) of a video transmission system according to the present invention.
Figure 5B:
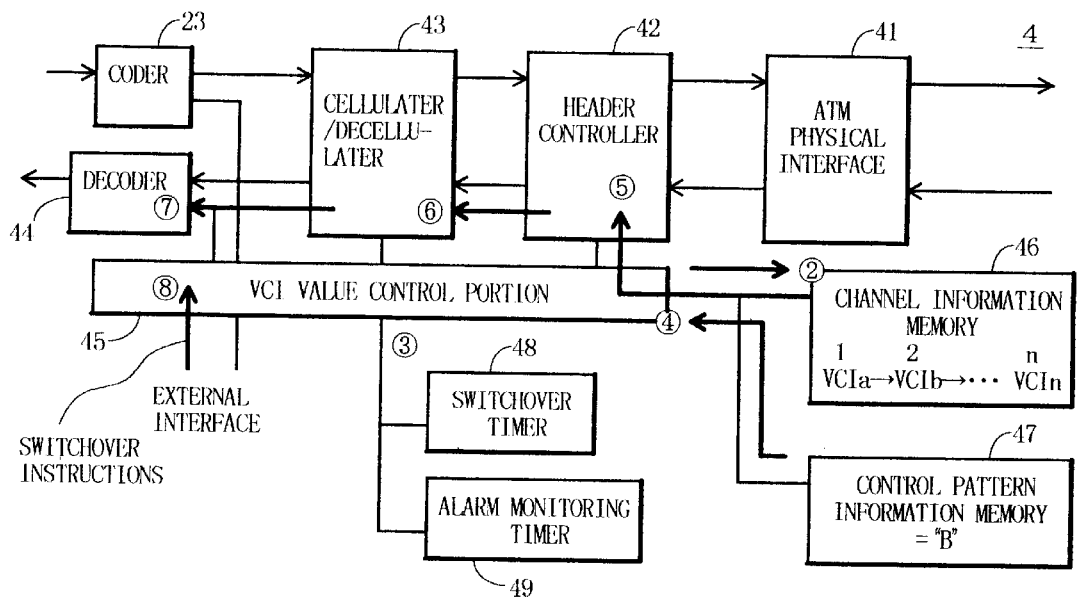

FIG. 5 shows an embodiment (2) of the video transmission system according to the present invention, the arrangement of which is the same as that in FIG. 4. However, in this embodiment it is different that the external interface inputs the video switchover timing signal and the receiver switches over the video data selected with every timing signal (hereinafter referred to as a control pattern "B").

Assuming that the pattern "B" is preset in the control pattern information memory 47, the operation of the video transmission system will be described referring to FIG. 5 as follows:

It is to be noted that the operations ①, ②, and ③ described above are the same as those in FIG. 4.

④ The VCI value control portion 45 reads out the control pattern "B" from the memory 47.

⑤ The control function portion 45 recognizes that the control pattern "B" is—an external timing switchover—, and reads out the lead channel information VCIa as an initial state from the memory 46, and sets it in the header controller 42.

⑥ The header controller 42 sends only the cell including the same virtual channel identifier as the set channel information VCIa to the cellulater/decellulater 43.

⑦ The decellulater 43 sends the decellulated video information to the decoder 44, which outputs the video data after having decoded the video information. The video of the camera 1a as an object will be reproduced in the display unit (not shown).

⑧ The external interface instructs the switchover to the VCI value control portion 45. The control portion 45 reads out the next channel information VCIb from the memory 46, and sets it in the header controller 42. Thereafter, the operations ⑥–⑧ are repeated and the camera video corresponding to the designated channel is switched over to be displayed by the display unit with respective switchover instructions.

Figure 6A:
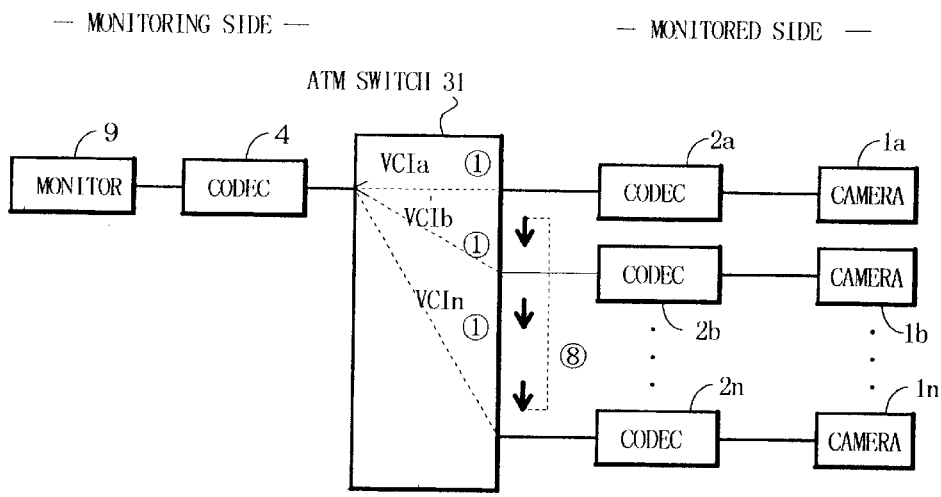
FIGS. 6A and 6B are block diagrams showing an operation embodiment (3) of a video transmission system according to the present invention.
Figure 6B:
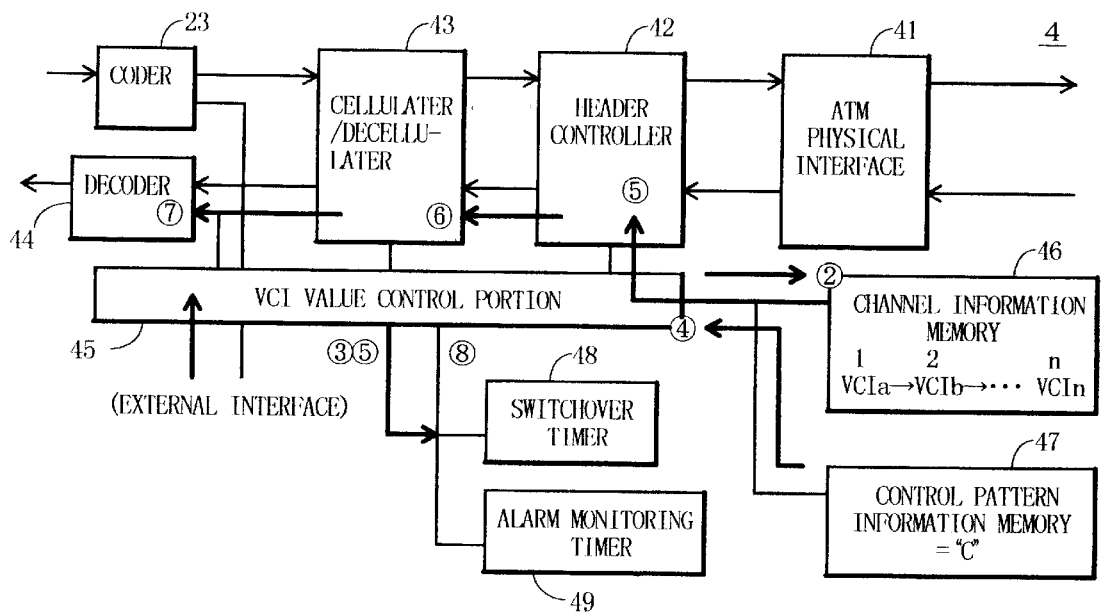

FIG. 6 shows an embodiment (3) of the video transmission system according to the present invention, the arrangement of which is the same as that in FIG. 5. However, in this embodiment it is different that the switchover timer 48 outputs the video switchover timing signal and the receiver 4 switches over the video data with every timing signal (hereinafter referred to as a control pattern "C").

Assuming that the control pattern "C" is preset in the control pattern information memory 47, the operation of the video transmission system will be described referring to FIG. 6 as follows:

It is to be noted that the basic operation for this control pattern "C" is the same as that described in FIG. 3.

The operations ① and ② above are the same as those in FIG. 5.

③ In the switchover timer 48 e.g. ten seconds are set as a display switchover time.

④ The VCI value control portion 45 reads out the control pattern "C" from the memory 47.

⑤ The control portion 45 recognizes that the control pattern "C" is—a sequential internal timing switchover—. After the lead channel information VCIa is read out from the memory 46 as the initial state and is set in the header controller 42, the switchover timer 48 is started.

⑥ The header controller 42 sends only the cell including the same virtual channel identifier as the set channel information VCIa to the cellulater/decellulater 43.

⑦ The decellulater 43 sends the decellulated video information to the decoder 44, which decodes the video information and outputs the video data. The video of the camera 1a as an object will be reproduced in the display unit (not shown).

⑧ When the time is up, the switchover timer 48 gives the switchover instruction to the VCI value control portion 45. The control portion 45 reads out the next channel information VCIb from the memory 46, sets it in the header controller 42, and restarts the switchover timer 48. Thereafter, the operations ⑥–⑧ are repeated, and the camera video of the designated channel is switched over to be displayed by the display unit every ten seconds.

Figure 7A:
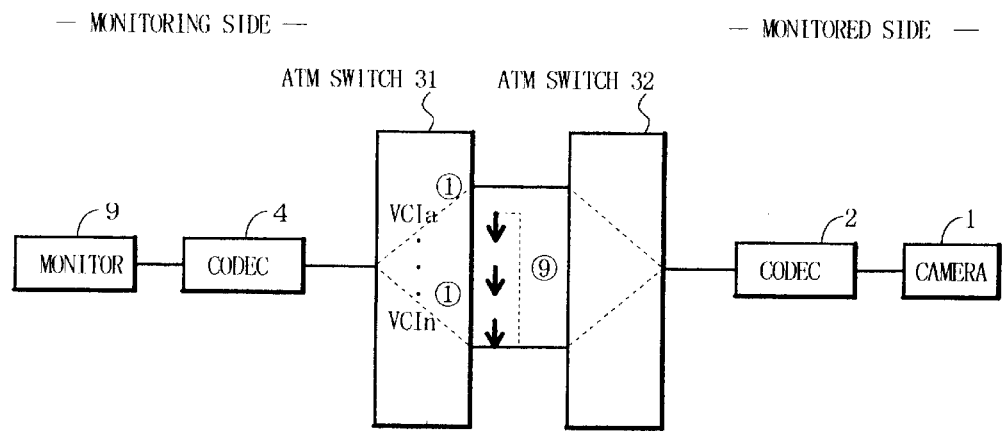
FIGS. 7A and 7B are block diagrams showing an operation embodiment (4) of a video transmission system according to the present invention.

FIG. 7 shows an embodiment (4) of the video transmission system according to the present invention. In this embodiment the camera 1 which is a video data generator as shown in FIG. 7A is connected to the transmitter (CODEC) 2, which is connected to the receiver (CODEC) 4 through the ATM switches 31, 32 with a plurality of routes, and the receiver 4 is connected to a monitor 9 which is the display unit.

Figure 7B:
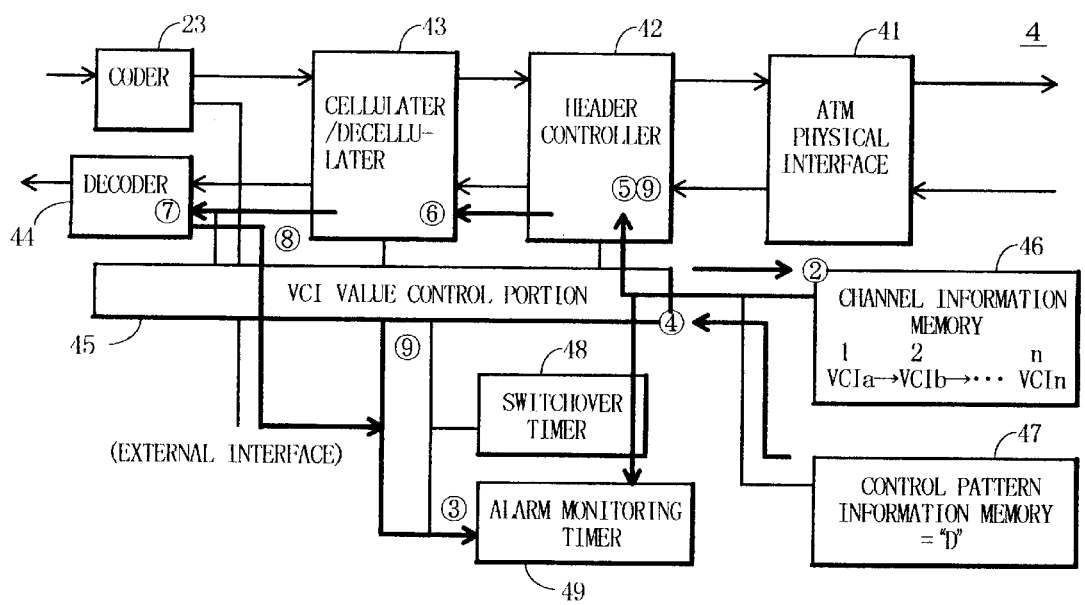

FIG. 7B specifically shows the receiver in this embodiment (4), the basic arrangement of which is the same as the that in FIG. 4. However, it is different from FIG. 4 in that the decoder 44 includes a fault detector (not shown) which detects a stream fault of the video and when the fault detector detects the fault the fault detecting signal is sent to the VCI value control portion 45.

In this embodiment, when the fault detector outputs a fault detection signal the switchover operation of the video data is executed (hereinafter referred to as a control pattern "D").

Assuming that the pattern "D" is preset in the control pattern information memory 47, the operation of this embodiment (4) will be described referring to FIG. 7 as follows:

① Between the transmitter 2 and the receiver 4 the virtual channels VCIa–VCIn which are a plurality of fixed virtual connections PVC are set up through the ATM switches 31, 32.

② The virtual channel VCIa as the normal connection and the virtual channels VCIb, . . . , VCIn as the detouring connection are respectively set in the channel information memory 46.

③ While the switchover timer 48 is assumed to be inoperative, the alarm monitoring timer 49 is set to have the time of e.g. 30 seconds.

④ The VCI value control portion 45 reads out the control pattern "D" from the memory 47.

⑤ The control portion 45 recognizes that the control pattern "D" is—an alarm switchover—. The lead channel information VCIa is read out from the memory 46 as the initial state and is set in the header controller 42. Moreover, the alarm monitoring timer 49 is started.

⑥ The header controller 42 sends only the cell including the same virtual channel identifier as the set channel information VCIa to the cellulater/decellulater 43.

⑦ The decellulater 43 sends the decellulated video information to the decoder 44, which decodes the video information and then outputs the video data. The video of the camera 1a as an object will be reproduced in the display unit (not shown). When a CODEC alarm is normally released, the alarm monitoring timer 49 is reset.

⑧ When a network fault has occurred, the decoder 44 detects the fault and sends the fault detecting signal to the VCI value control portion 45. The control portion 45 starts the alarm monitoring timer 49.

⑨ When the time of the timer 49 is up without the fault being restored, the control portion 45 reads out the next detouring channel information VCIb from the memory 46, sets the value in the header controller 42, and starts the alarm monitoring timer 49. Thereafter, the operations ⑥–⑨ are repeated. After the detouring channel information has reached the last VCIn, it returns to the lead channel information VCIa.

As a result, when the network fault occurs, it becomes possible for the receiver 4 to switch over autonomously by selecting the detouring connection which is preset.

When the transmitters and the receiver are mutually connected with the virtual connection, it is also possible to connect each of the transmitters and the receiver with a plurality of virtual connections for the preparation of the detouring virtual connection. When such a virtual connection is set up, the connection (channel) information memory has only to store the connection (channel) information by two dimensions in the (transmitter switchover) direction of screen switchover connection (channel) information and in the direction of detouring switchover connection (channel) information.

Figure 8A:
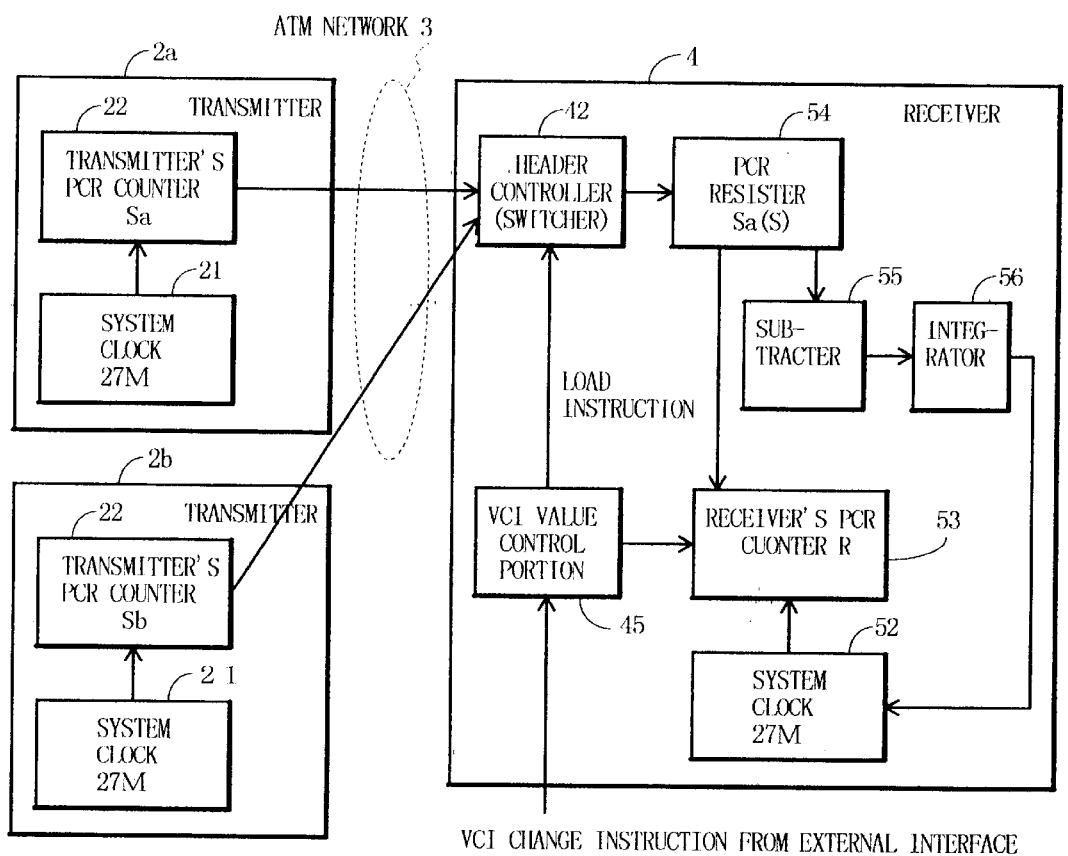
FIGS. 8A and 8B are block diagrams showing an operation embodiment (5), particularly relating to a clock synchronization in a video transmission system according to the present invention.

FIG. 8 shows an embodiment (5) of the video transmission system according to the present invention. This embodiment particularly shows an operation example of synchronizing the system clocks of the receiver and the transmitters. FIG. 8A shows an arrangement of the transmission system, in which the transmitters 2a and 2b are connected to the receiver 4.

The transmitters 2a and 2b include the system clock 21 of e.g. 27 MHz and a transmitter's PCR counter 22 which is a clock information counter connected to the system clock 21 and the receiver 4.

The receiver 4 comprises the header controller 42 which is a switch connected to the transmitter's PCR counter 22 in the transmitters 2a, 2b, the VCI value control portion 45, a PCR register 54 which is a clock information register connected to the controller 42, a PCR counter 53 which is a receiver's clock information counter connected to the register 54 and the control function portion 45, a subtracter 55 which is connected to the PCR counter 53 and the PCR register 54, an integrator 56 which is connected to the subtracter 55, and a system clock 52 which is connected to the integrator 56 and the PCR counter 53.

Figure 8B:
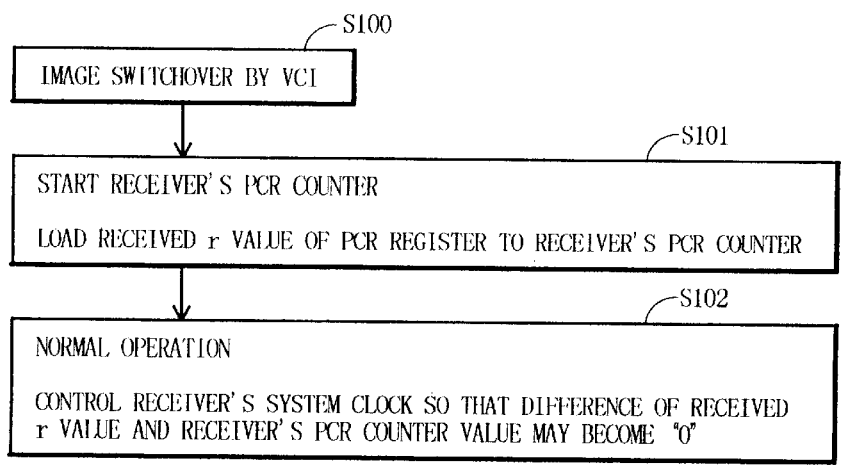

FIG. 8B shows a basic operation example of this embodiment. Thereafter, the operation will be described referring to FIG. 8 as follows:

The PCR counter 22 in the transmitters 2a and 2b counts the system clocks 21 of its own and transmits the count values Sa and Sb to the receiver 4 respectively together with the video information.

In the receiver 4, the VCI value control portion 45 instructs the header controller 42 to switch over to e.g. the video of the transmitter 2a based on the VCI change instruction from the external interface (not shown). The header controller 42 executes the switchover of the video, selects the count value "Sa" sent from the transmitter 2a and sends it to the PCR register 54 (at step S100 in FIG. 8). The PCR register 54 temporarily stores this value "Sa".

The VCI value control portion 45 sends loading instructions for reading in the value "Sa" of the PCR register 54 to the PCR counter 53 according to the switch timing. After being loaded with the value "Sa" (at step S101), the PCR counter 53 executes the count of the system clock 52. On the other hand, the PCR register 54 sequentially stores the count value "S" sent from the PCR counter 22 of the transmitter 2a. Namely, the PCR register 54 will synchronously indicate the value of the PCR counter 22 in the transmitter 2a.

The subtracter 55 calculates the difference between the value "S" of the PCR register 54 and the value "R" of the PCR counter 53, which is given to an integrator 56. The integrator 56 gives the phase difference information of smoothed "S" and "R" to the system clock 52. The controller of the system clock 52 (not shown) controls the frequency of the system clock 52 so that the phase difference may become "0" (at step S102).

As a result, it is possible for the receiver 4 to lead in the frequency of the system clock 52 of its own to synchronize the frequency of the system clock 21 of its own with the frequency of the system clock 21 of the transmitter connected to the presently designated virtual connection at a high-speed (PLL operation).

Figure 9:
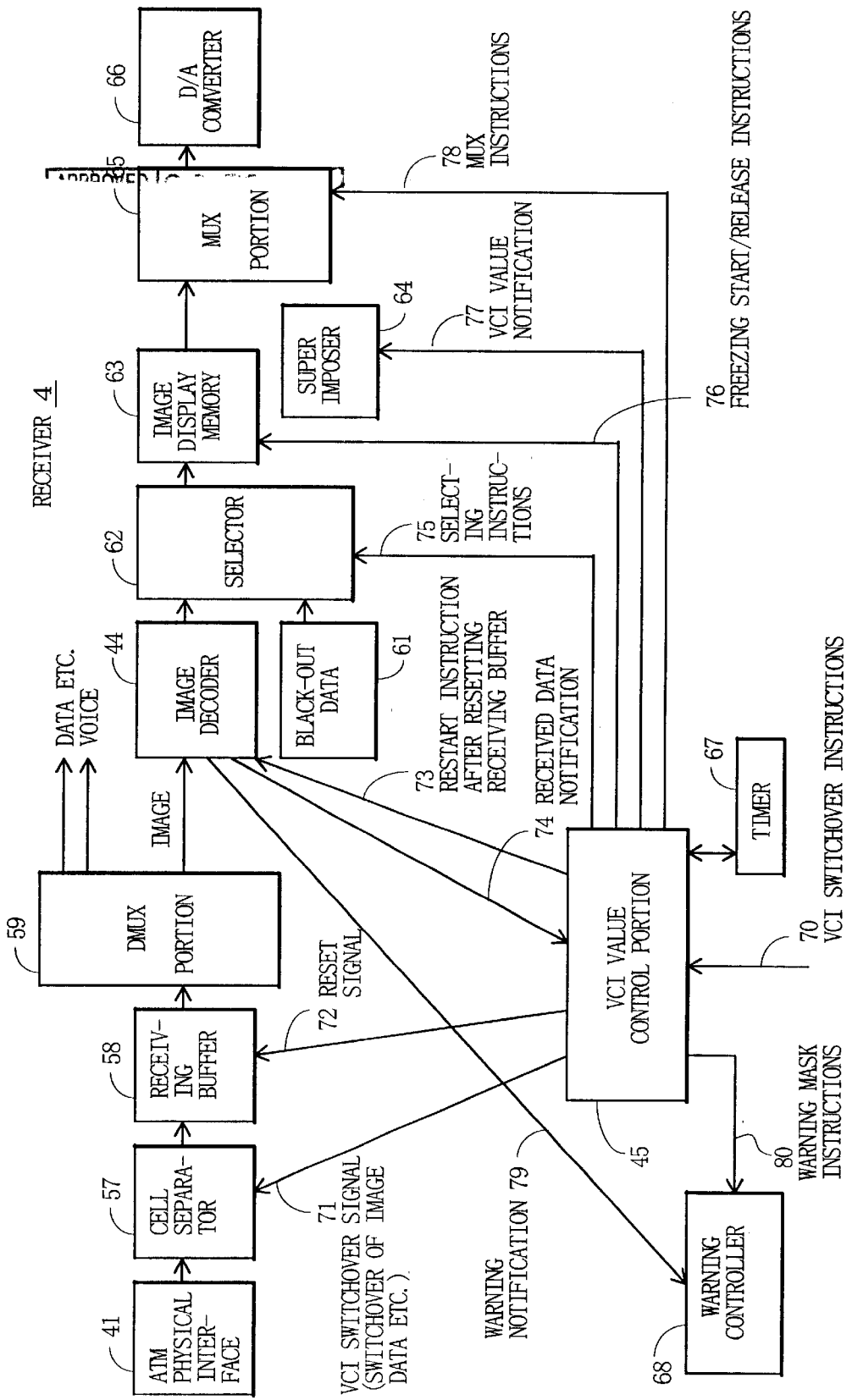
FIG. 9 is a block diagram showing another embodiment of a receiver used in the present invention.
Figure 10:
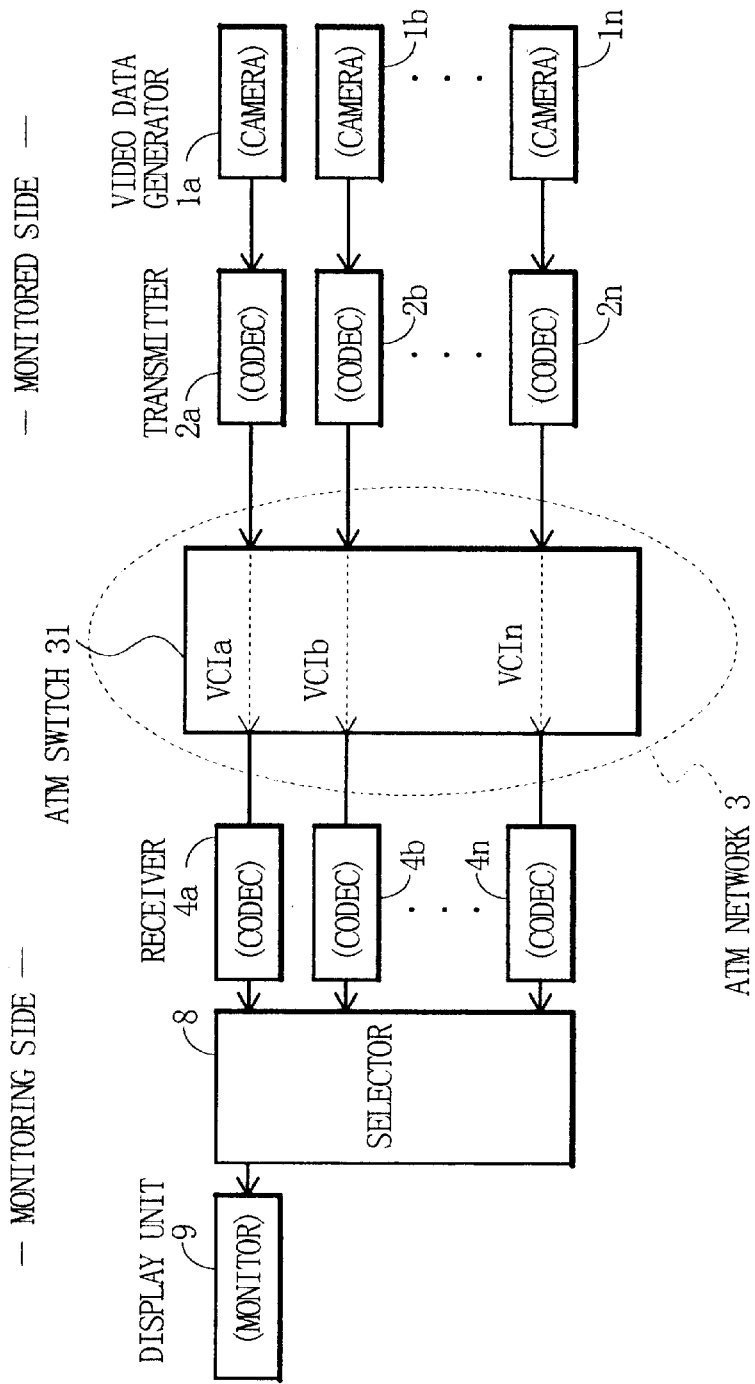
FIG. 10 is a block diagram showing an arrangement (1) of a conventional video transmission system.

FIG. 9 shows another embodiment of the receiver used in the present invention. The ATM physical interface 41, a cell separator 57, the receiving buffer 58, a DMUX portion 59, a video decoder 44, a selector 62, the video display memory 63, a MUX portion 65, and a D/A converter 66 are connected in cascade in this order. In addition, blackout data 61 are inputted to the selector 62, and the output of a superimposing portion 64 is inputted to the MUX portion 65.

The VCI value control portion 45 provides a VCI switch signal 71, a reset signal 72, post-reset restart instructions 73, selecting instructions 75, freezing start/release instructions 76, a VCI value notification 77 and MUX instructions 78 for the cell separator 57, the receiving buffer 58, the video decoder 44, the selector 62, the video display memory 63, the superimposing portion 64, and the MUX portion 65, respectively.

In addition, the control function portion 45 is connected to a monitoring timer 67, and inputs VCI switchover instructions 70 from the outside. The video decoder 44 provides a warning notification 79 and the receiving data notification 74 to the warning controller 68 and the VCI value control portion 45, respectively.

In operation, the VCI value control portion 45 receives the VCI switchover instructions 70, transmits the VCI switchover signal 71 to the cell separator 57, and compulsorily clears the receive buffer 58 with the reset signal 72. After having reset the receiving buffer 58, the control function portion 45 restarts the video decoder 44 with the restart instructions 73.

The cell separator 57 separates and extracts only cells of the designated VCI from among the cells inputted from the ATM physical interface 41, which are sent to the receiving buffer 58. The receiving buffer 58 sends the video information as temporarily stored to the DMUX portion 59, which separates data information and voice information included in the video information and sends only the video information to the video decoder 44. The video decoder 44 decodes the video information.

As a result, the receiving buffer 58 starts to store the video information from the state where there is no remainder of the buffer upon the VCI switchover connection, thereby preventing the overflow of the buffer.

Normally, the control function portion 45 sends the selecting instructions 75 to the selector 62 so that the output of the video decoder 44 may be inputted to the video display memory 63. At the timing of the VCI switchover instructions 70 inputted, the control function portion 45 sends the freezing start/release instructions 76 which indicate "freezing start" and warning mask instructions 80 to the video display memory 63 and the warning controller 68, respectively. In response, the video display memory 63 stops the reading of the video data from the video decoder 44.

The control function portion 45 receives from the video decoder 44 the receiving data notification 74 indicating that a single new screen has been completed, and sends the freezing start/release instructions 76 which indicates "freezing release" to the video display memory 63. The video display memory 63 starts the reading of the video data. The video decoder 44 detects a discontinuity of the stream which occurs upon the video switchover and sends the warning notification 79 to the warning controller 68. Having already received the warning mask instruction 80 as mentioned above, the warning controller 68 neglects the warning notification 79.

As a result, it becomes possible to remove the disorder of the screen which occurs upon the video switchover by freezing the display screen of the display unit and to mask the warning notification 79 which occurs upon the video switchover.

Receiving the VCI switchover instructions 70, the control portion 45 sets e.g. 1 second for the setting time in the monitoring timer 67 to be started. After one second from the time expiration, until the control portion 45 receives the receiving notification 74 indicating that the new screen has been completed, the control portion 45 sends the selecting instructions 75 indicating the selection of the blackout data to the selector 62. The selector 62 selects the blackout data 61 and gives it to the video display memory 63. The video display memory 63 reads in the blackout data 61 to make a blackout display state.

As a result, the screen of the display unit freezed upon the screen switchover is released from the freezed state and is blacked out unless the new screen is completed for one second or more after the switchover. Accordingly, the monitoring person can easily notice the abnormality of the next transmission screen.

Moreover, the VCI value control portion 45 notifies the present VCI value to the superimposing portion 64 with the VCI value notification 77 and sends the MUX instructions 78 to the MUX portion 65. The superimposing portion 64 reads out and outputs a place name from an internal corresponding table of place name-VCI value from the notified VCI value. The MUX portion 65 overlaps the place name and the output of the video display memory 63 and outputs them to the D/A converter 66. This output signal is D/A-converted by the D/A converter 66.

As a result, it becomes possible to display on the video display screen the place name from which the video data are sent in the superimposed form.

As described above, a video transmission system according to the present invention is arranged such that an ATM network sets up fixed virtual connections between transmitters and a receiver; in the receiver, a connection control portion designates a desired one of the virtual connections, and a header controller only extracts cells of the designated virtual connection. Therefore, it becomes possible to remove a temporary freeze or a blackout of the display screen which occurs upon the switchover time of video data and in turn to switch over video data at a high-speed.

Also, the video transmission system according to the present invention can be arranged such that the ATM network connects transmitters and a receiver with a plurality of fixed virtual connections; in the receiver, a connection information memory stores the virtual connections so as to be read out in a predetermined order, when a fault of the virtual connection is detected a connection control portion reads out the next virtual connection for detour from the connection information memory and designates it to the header controller, and a header controller only extracts cells of the designated virtual connection. Therefore, it becomes possible to autonomously switch over a working connection where the fault has occurred to the detouring connection.

Moreover, in the receiver, a clock information register temporarily stores a system clock information value in order included in the extracted cells, and a clock information counter loads the value of the clock information register upon the video switchover timing and counts the clock in the clock generator and the frequency of the system clock generator is controlled so that the values of both the clock information register and the receiver's clock information counter may become equal. Accordingly, it becomes possible to reduce the time required to lead in the system clock.

What we claim is:

1. A video transmission system comprising:

transmitters in which video data from a plurality of video data generators are encoded, cellulated and outputted;

an ATM network which transmits the cellulated video data;

a receiver in which the cellulated video data received through the ATM network are decellulated, decoded and outputted; and a display unit which displays the video data;

the ATM network providing fixed virtual connections between the transmitters and the receiver, and the receiver including
   a connection control portion for designating a desired one of the virtual connections; and
   a header controller which only extracts cells of the designated virtual connection,
   wherein the receiver further includes a connection information memory which has stored the virtual connections to be read out in a predetermined order, the receiver further includes a switchover timer which times a switchover timing of the virtual connection, and
   the connection control portion reads out the virtual connection stored in the connection information memory at the switchover timing and designates the virtual connection to the header controller.

2. A video transmission system comprising:

transmitters in which video data are encoded, cellulated and outputted, an ATM network which transmits the cellulated video data, and a receiver in which the cellulated video data received through the ATM network is decellulated, decoded and outputted;
the ATM network providing a plurality of fixed virtual connections between the transmitters and the receiver, and
the receiver including;
  a header controller which only extracts cells of a designated one of the virtual connections,
  a connection information memory which has stored the virtual connections to be read out in a predetermined order,
  a fault detector which detects a fault of the designated virtual connection,
  an alarm monitoring timer which times a continuous time of the fault, and
  a connection control portion which reads out a next virtual connection for detour from the memory when the fault continues longer than a predetermined time, and designates the virtual connection for detour as the designated virtual connection to the header controller.

3. A video transmission system as claimed in claim 2 wherein the fault detector detects that a stream of the video data is discontinuous.

4. A video transmission system comprising:
transmitters in which a single or a plurality of video data are encoded, cellulated and outputted,
an ATM network which transmits the cellulated video data, and
a receiver in which the cellulated video data received through the ATM network are decellulated, decoded and outputted;
the ATM network providing a single or a plurality of fixed virtual connections between the transmitters and the receiver, and
the receiver including;
  a header controller which only extracts cells of a designated one of the virtual connections,
  a control pattern information memory which has stored a control pattern,
  a connection information memory which has stored the designated virtual connection to be read out in a predetermined order,
  a switchover timer which times a switchover timing of the virtual connection,
  a fault detector which detects a fault of the designated virtual connection,
  an alarm monitoring timer which times a continuous time of the fault, and
  a connection control portion which designates, based on the control pattern, a single selected virtual connection to the header controller which corresponds to the virtual connection designated from outside, the virtual connection which is read out from the connection information memory in order at every external input timing or the switchover timing, or the virtual connection for detour which is read out from the connection information memory when the fault continues longer than a predetermined time.

5. A video transmission system comprising:
transmitters in which video data from a plurality of video data generators are encoded, cellulated and outputted;
an ATM network which transmits the cellulated video data;
a receiver in which the cellulated video data received through the ATM network are decellulated, decoded and outputted; and
a display unit which displays the video data;
the ATM network providing fixed virtual connections between the transmitters and the receiver, and
the receiver including;
  a connection control portion for designating a desired one of the virtual connections at a predetermined switchover timing, and
  a header controller which only extracts cells of the designated virtual connection,
wherein each of the transmitters includes a transmitter's system clock generator, a transmitter's clock information counter which counts the system clock information based on a clock of the clock generator, and makes the cellulated video data include the system clock information, and
the receiver includes
  a header controller which only extracts cells of the designated virtual connection,
  a clock information register which temporarily stores in order a system clock information value included in the extracted cells,
  a receiver's system clock generator,
  a receiver's clock information counter which loads the value of the clock information register at the predetermined switchover timing and counts the clock of the receiver's clock generator,
  a subtracter which subtracts the values between the clock information register and the receiver's clock information counter, and
  a control circuit which controls a frequency of the receiver's system clock generator so that the subtracter value may become 0.

6. A video transmission system as claimed in claim 5 wherein the system clock information comprises a PCR clock standard information prescribed by MPEG 2.

7. A video transmission system comprising:
transmitters in which video data from a plurality of video data generators are encoded, cellulated and outputted;
an ATM network which transmits the cellulated video data;
a receiver in which the cellulated video data received through the ATM network are decellulated, decoded and outputted; and
a display unit which displays the video data;
the ATM network providing fixed virtual connections between the transmitters and the receiver, and
the receiver including
  a connection control portion for designating a desired one of the virtual connections, and
  a header controller which only extracts cells of the designated virtual connection,
wherein the receiver further includes a video display memory for storing the video data, and the connection control portion stops writing the video data in the video display memory when the virtual connection is designated and freezes the present display.

8. A video transmission system comprising:
transmitters in which video data from a plurality of video data generators are encoded, cellulated and outputted;
an ATM network which transmits the cellulated video data;
a receiver in which the cellulated video data received through the ATM network are decellulated, decoded and outputted; and
a display unit which displays the video data;
the ATM network providing fixed virtual connections between the transmitters and the receiver, and
the receiver including
  a connection control portion for designating a desired one of the virtual connections at a predetermined switchover timing, and a header controller which only extracts cells of the designated virtual connection, wherein the receiver further includes a video decoder for decoding the decellulated video information to the video data to be sent to the video display memory and detects a stream discontinuity of the video information to generate a warning signal, and the connection control portion masks the warning signal for a predetermined time at the switchover timing.

9. A video transmission system comprising:

transmitters in which video data from a plurality of video data generators are encoded, cellulated and outputted;

an ATM network which transmits the cellulated video data;

a receiver in which the cellulated video data received through the ATM network are decellulated, decoded and outputted; and a display unit which displays the video data;

the ATM network providing fixed virtual connections between the transmitters and the receiver, and the receiver including
a connection control portion for designating a desired one of the virtual connections at a predetermined switchover timing, and
a header controller which only extracts cells of the designated virtual connection,
wherein the receiver further includes
a blackout data generator which generates blackout data for blacking out the screen of the display unit,
a selector which selects the blackout data or the video data from the video decoder and outputs the video data to the video display memory,
a timer which times a time until a receiving data notification signal showing that a new screen is completed is received out of the video decoder from the predetermined switchover timing as a start point and outputs a time-out signal when the time is longer than a predetermined time, and
the connection control portion instructs the selector to select the blackout data when the time-out signal is received and the video display memory to cancel write stop of the video data.

10. A video transmission system comprising:

transmitters in which video data from a plurality of video data generators are encoded, cellulated and outputted;

an ATM network which transmits the cellulated video data;

a receiver in which the cellulated video data received through the ATM network are decellulated, decoded and outputted; and a display unit which displays the video data;

the ATM network providing fixed virtual connections between the transmitters and the receiver, and the receiver including
a connection control portion for designating a desired one of the virtual connections at a predetermined switchover timing, and
a header controller which only extracts cells of the designated virtual connection,
wherein the receiver further includes a cell separator, and a receiving buffer which is connected between the cell separator and the video decoder and which temporarily stores the video information from the cell separator, and
the connection control portion clears the receiving buffer at the predetermined switchover timing.

11. A video transmission system comprising:

transmitters in which video data from a plurality of video data generators are encoded, cellulated and outputted;

an ATM network.which transmits the cellulated video data;

a receiver in which the cellulated video data received through the ATM network are decellulated, decoded and outputted; and a display unit which displays the video data;

the ATM network providing fixed virtual connections between the transmitters and the receiver, and the receiver including
a connection control portion for designating a desired one of the virtual connections, and
a header controller which only extracts cells of the designated virtual connection,
wherein the receiver further includes a superimposing portion which stores an identifier or position information of the transmitter corresponding to the virtual connection and outputs the identifier or the position information corresponding to the virtual connection designated by the connection control portion, and
a multiplexer which superimposes the outputs of the superimposing portion and the video display memory by an instruction of the connection control portion.

12. A video transmission method comprising the steps of:

endoding, cellulating, and transmitting video data, receiving, decellulating, and decoding the cellulated video data received through an ATM network providing fixed virtual connections, extracting only cells of a designated one of in the virtual connections, reading out the virtual connections stored in a memory in a predetermined order, detecting a fault of the designated virtual connection, timing a continuous time of the fault, reading out a next virtual connection for detour from the memory when the fault continues longer than a predetermined time, and designating the virtual connection for detour as the designated virtual connection for the extraction.

13. A video transmission method comprising the steps of:

endoding, cellulating, and transmitting video data, receiving, decellulating, and decoding the cellulated video data received through an ATM network providing fixed virtual connections, extracting only cells of a designated one of the virtual connections, reading out the virtual connections stored in a memory in a predetermined order, timing a switchover timing of the virtual connection, detecting a fault of the designated virtual connection, timing a continuous time of the fault, and designating, based on a stored control pattern, a single selected virtual connection for the extraction which corresponds to the virtual connection designated from outside, the virtual connection which is read out from the memory in order at every external input timing or the switchover timing, or the virtual connection for detour which is read out from the memory when the fault continues longer than a predetermined time.

* * * * *